United States Patent [19]
Holdeman et al.

[11] 3,878,959
[45] Apr. 22, 1975

[54] STACK MOVER

[75] Inventors: Adin F. Holdeman, Hesston; Melvin V. Gaeddert, Newton, both of Kans.

[73] Assignee: Hesston Corporation, Hesston, Kans.

[22] Filed: Jan. 8, 1973

[21] Appl. No.: 321,785

[52] U.S. Cl.............. 214/766; 214/130 R; 214/506; 280/43.23
[51] Int. Cl................................................ B66f 9/12
[58] Field of Search................ 214/766, 506, 144; 280/43.11, 43.23, 43.12, 43.17, 43.22

[56] References Cited
UNITED STATES PATENTS

| | | | |
|---|---|---|---|
| 1,187,742 | 6/1916 | Johnson | 214/144 X |
| 3,199,693 | 8/1965 | Schedeen | 214/766 |
| 3,375,940 | 4/1968 | Thompson | 214/6 B |
| 3,635,492 | 1/1972 | Mauldin | 280/43.23 |

*Primary Examiner*—Albert J. Makay
*Assistant Examiner*—Jerold M. Forsberg
*Attorney, Agent, or Firm*—Schmidt, Johnson, Hovey & Williams

[57] ABSTRACT

A stack mover has a stack-receiving assembly provided with a horizontal tube and a plurality of forks on the tube. A U-shaped carrier for the assembly has a shaft at its bight passing through the tube and a pair of arms supported by caster wheels. A power cylinder between the assembly and the carrier raises the shaft and the tube to lift the stack as the arms swing about the wheel axles. Connections between the tube and a tractor limit the extent of rotation of the tube relative to the shaft. When used with the three-point hitch of a tractor the entire mover may be raised for full support by the tractor.

7 Claims, 8 Drawing Figures

STACK MOVER

In the moving of a stack of hay or other crop, as for example, from a field to a feedlot, it is desirable to permit a one man operation through use of stack-receiving forks which may be forced beneath the stack during rearward movement of a tractor with which the mover is connected. Thereupon it is to be desired that the stack be raised off the ground, transported to a point of deposit and then lowered back to the ground, following which the forks should be movable from beneath the deposited stack as the tractor is advanced forwardly.

Such is the subject matter of the present invention, coupled with the additional advantage of supporting the stack by ground wheels as the mover is placed in tow behind the tractor during transport.

The results are accomplished by virtue of the inclusion of a joint which presents an articulation between a stack-receiving assembly that includes the forks and a wheeled carrier for such assembly.

Structure is also included for limiting the extent of swinging movement of the assembly while it is being raised and lowered such that the degree of tilt of the forks in the raised position may be preselected simply by choosing the desired geometry.

A simple power assembly effects the raising and lowering and, in one embodiment of the invention, the mover is adapted for connection with a three-point hitch of a tractor such that during over-the-road travel, for example, the entire mover, including its wheels, may be raised off the ground for full support by the tractor.

Other embodiments adapt the mover for towing behind a conventional tractor drawbar.

Figure 1:
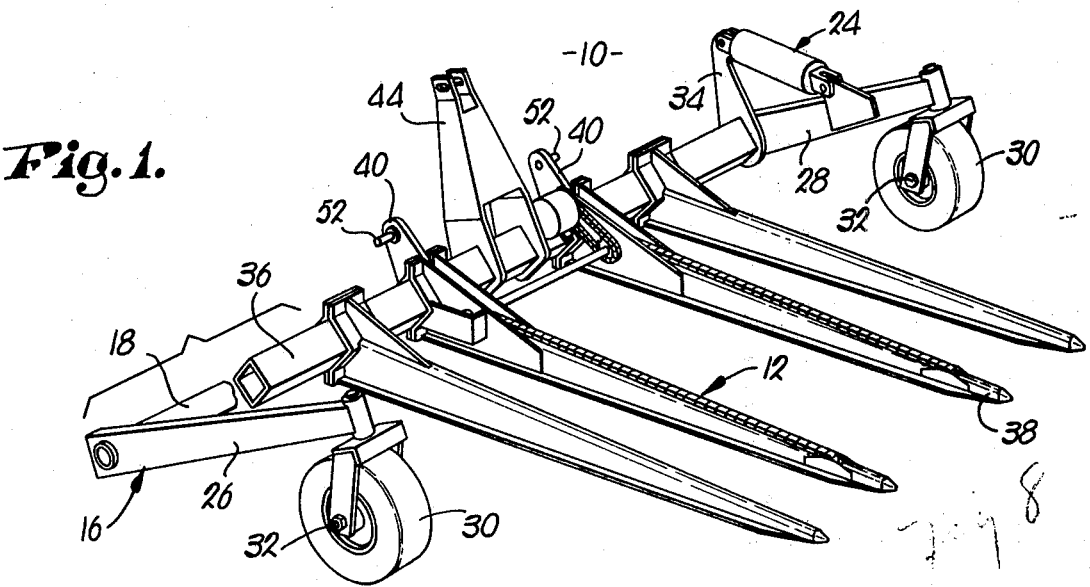
FIG. 1 is a perspective view of one form of stack mover made according to the present invention.

In the embodiment of FIGS. 1-6, a stack mover 10 has an assembly 12 for receiving a stack 14, a ground-supported carrier 16 for the assembly 12 provided with an elongated, normally horizontal cross element at one end thereof in the nature of a shaft 18 shiftable toward and away from the ground 20, and power means in the nature of a fluid pressure piston and cylinder unit 24 between the assembly 12 and the carrier 16 for shifting (raising and lowering) the shaft 18.

The carrier 16 includes additionally a pair of arms 26 and 28 rigid to and extending laterally from the shaft 18, each of which is ground-supported by a caster wheel 30 remote from the shaft 18 and having an axle 32. The unit 24 pivotally interconnects the arm 28 with a crank 34 rigid to an elongated element in the nature of a tube 36 forming a part of the assembly 12.

Figure 5:
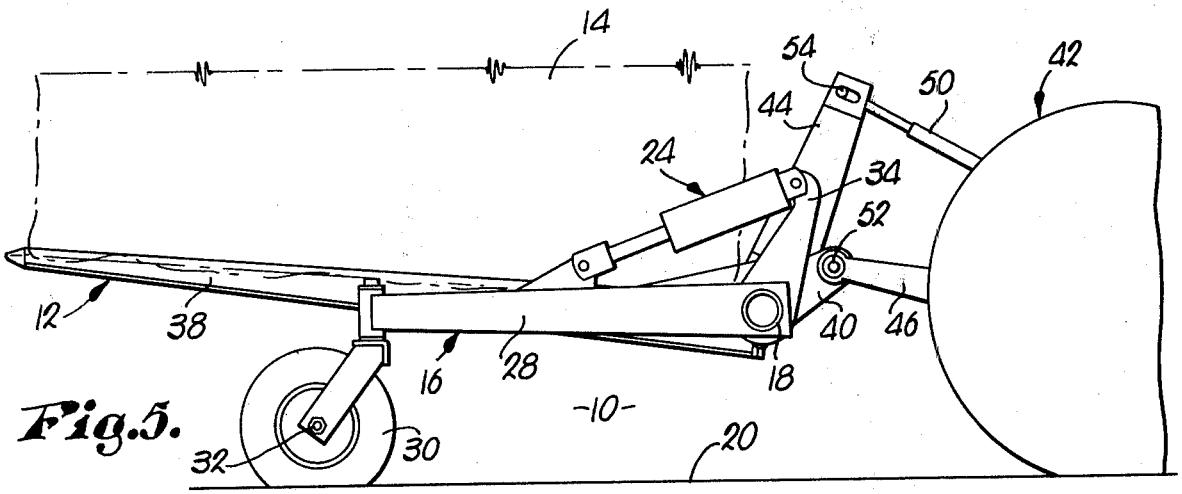
FIG. 5 is a view similar to FIG. 2 but showing the loaded stack in an elevated position.
Figure 6:
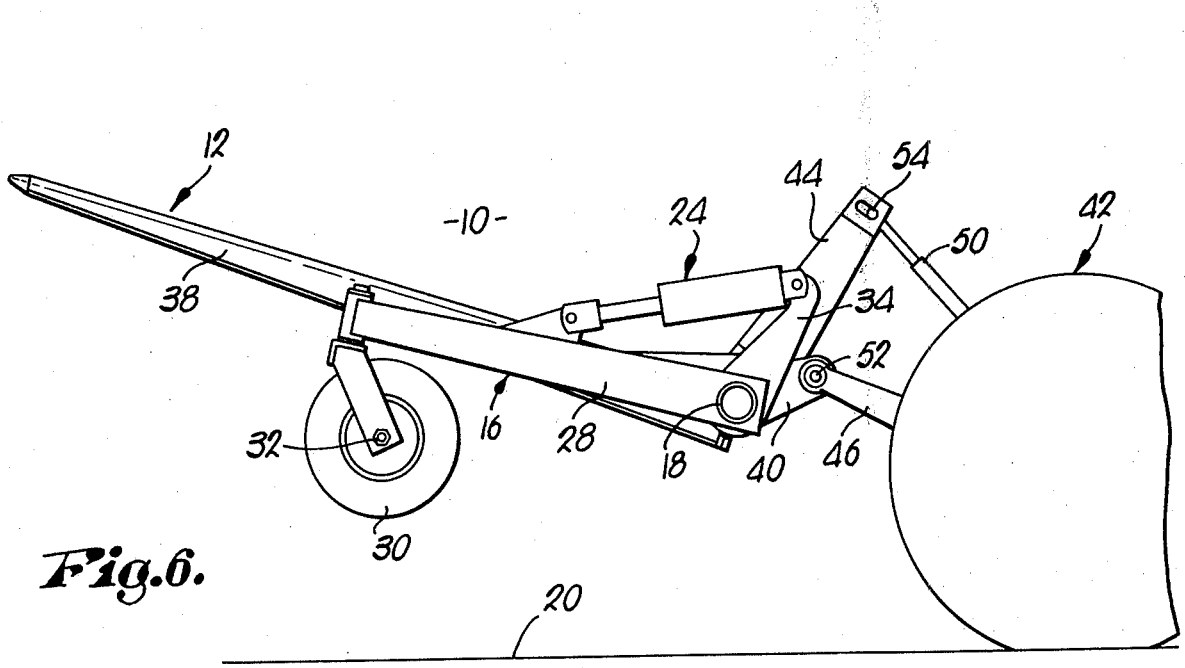
FIG. 6 is a view similar to FIGS. 2 and 5 showing the mover raised off the ground.

The assembly 12 includes additionally a stack lifting and transporting bed in the nature of a plurality of forks 38 rigid to and extending laterally from the tube 36 such as to be disposed between the wheels 30 when the assembly 12 is lowered (FIGS. 1 and 2) and between the arms 26 and 28 when the assembly 12 is raised (FIGS. 5 and 6). The shaft 18 extends through the tube 36 and is rotatable relative thereto, presenting a joint forming an articulation between the assembly 12 and the proximal end of the carrier 16.

Figure 2:
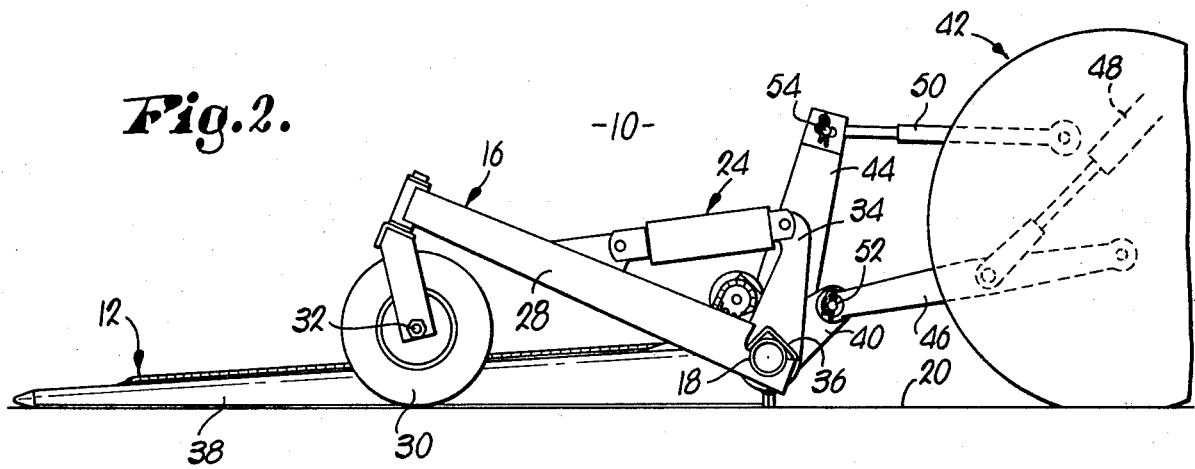
FIG. 2 is a side elevational view thereof shown connected with a tractor and with the forks lowered to the ground.
Figure 3:
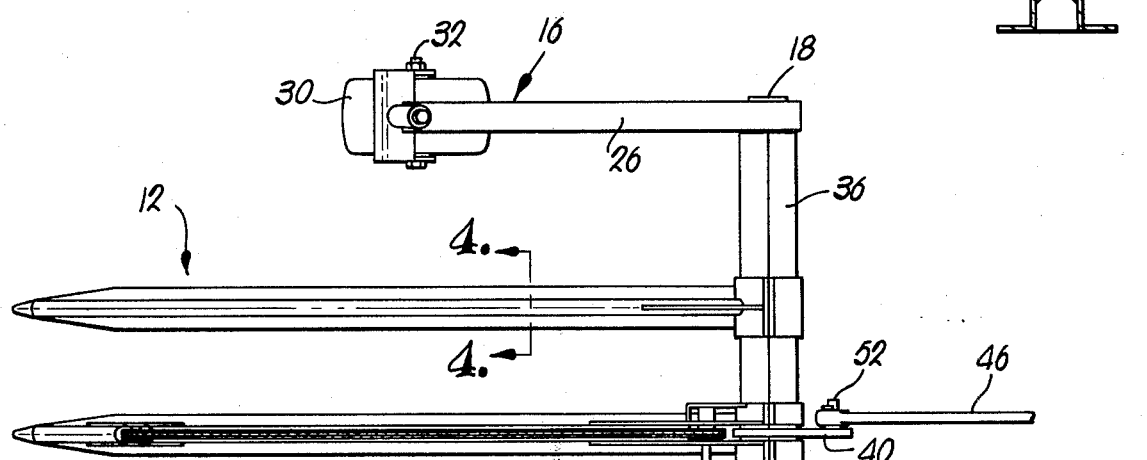
FIG. 3 is a plan view thereof.
Figure 4:
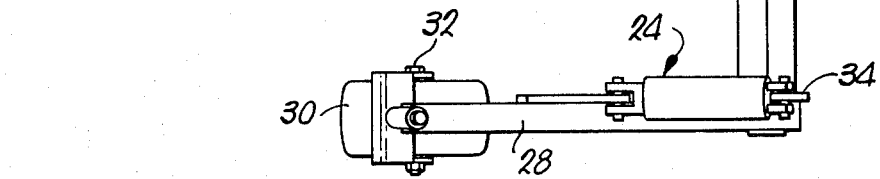
FIG. 4 is a cross-sectional view taken on line 4—4 of FIG. 3.

Structure for limiting the extent of swinging movement of the assembly 12 at such joint during shifting of the carrier 16 between the positions shown in FIGS. 2 and 5 includes tow means in the nature of cranks 40 rigid to the tube 36 together with a device in the nature of still another crank 44.

A mobile vehicle, such as the tractor 42, has a three-point hitch provided with a pair of power links 46, each of which is raised and lowered by a hydraulic cylinder 48, and a swingable stabilizer link 50. Pins 52 on cranks 40 pivotally attached to the links 46 and a pin 54 on the crank 44 provide the mechanism for releasably connecting the towing means of the mover 10 with the tractor 42. As illustrated best in FIG. 2, there is an angular relationship between the plane of links 46 and the plane of forks 38 when the latter are on the ground. The horizontal swinging axis for mover 10 defined at the inner ends of links 46 is thus offset vertically from the plane of forks 38, allowing the latter to lie flatly rather than be tipped up when fully lowered.

Figure 7:
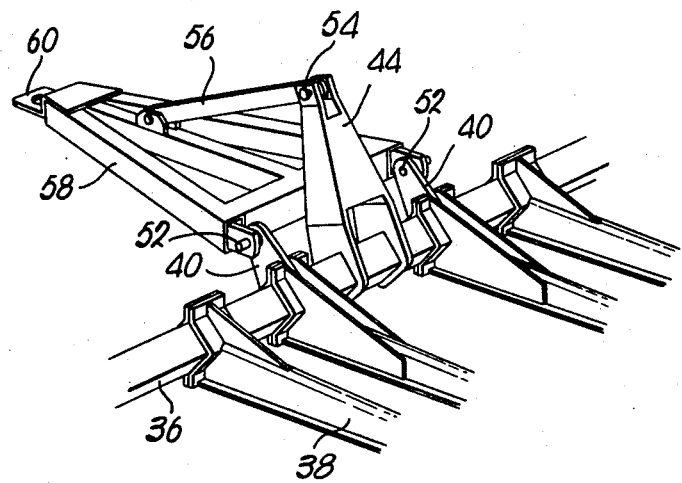
FIG. 7 is a perspective view of the mover showing its adaptation for use with a tractor drawbar.

Stack mover 10 is shown in FIG. 7 with a bar 56 that connects the crank 44 with a tongue 58 to preclude pivotal movement of the latter about the pins 52. A bracket 60 on the tongue 58 pivotally receives the hitch pin of a tractor drawbar (not shown). As illustrated, tongue 58 is spaced above forks 38, extending in substantially parallel relationship thereto, so that the horizontal swinging axis for mover 10 defined at the bracket 60 is vertically offset with respect to the plane of forks 38.

Figure 8:
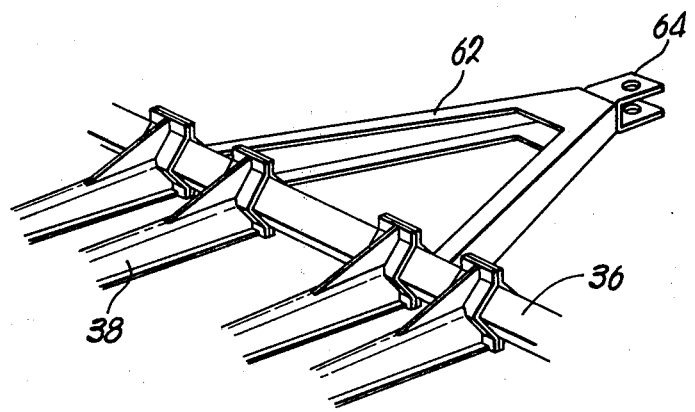
FIG. 8 is a perspective view of the mover illustrating another adaptation to the drawbar of a tractor.

Alternately, as illustrated in FIG. 8, the cranks 40 and 44 are eliminated in favor of a tongue 62 which is rigid to the tube 36 and provided with a similar hitch bracket 64 capable of being pivotally connected to a tractor drawbar. As illustrated, the tongue 62 extends angularly upwardly from the tube 36 whereby to locate the horizontal swinging axis for mover 10 (defined at bracket 64) vertically offset with respect to the plane of forks 38. The latter may thus lie flatly against the ground when fully lowered as with the versions of FIGS. 1-6 and 7.

When used with the tractor connection of FIGS. 7 and 8, the wheels 30 of the mover 10 should be locked against castering.

OPERATION

With reference first to FIGS. 1-6, the mover 10, with the forks 38 lowered to the ground 20, is ready for reception of the stack 14, and such is accomplished by reverse movement of the tractor 42 so as to slip the forks 38 beneath the stack 14. The cylinders 48 have no fluid under pressure at this time and the links 46 and 50 are free to rise and fall as the wheels 30 roll along the ground 20 and as the forks 38 follow the contour of the ground 20 beneath the stack 14.

The links 46 and 50 remain free to move as the stack 14 is then raised to the position shown in FIG. 5 by actuation of the power unit 24. As the cylinder unit 24 is extended from the condition shown in FIG. 2 to the condition illustrated in FIG. 5 such as to increase the distance between the upper end of the crank 34 and the pivotal connection of the unit 24 with the arm 28, wheels 30 on the ground 20 resist the power of the unit 24 and the force of the latter is transmitted to the crank 34, applying torque to the tube 36 counterclockwise viewing FIGS. 2 and 5. As a result, the shaft 18 and the tube 36 rise away from the ground 20 as the arms 26 and 28 swing vertically about the axles 32.

Simultaneously, the links 46 and 50 swing upwardly and the shaft 18 rotates within the tube 36. Moreover, the forks 38 become slightly inclined as shown in FIG. 5, the amount of such inclination depending upon preselected dimensions of components and the purpose being to preclude stack 14 from slipping from the free ends of the forks 38 during transport.

After the stack 14 is thus loaded as shown in FIG. 5, it is towed by the tractor 42 to a point of discharge, supported by the wheels 30 which caster to the position shown in FIG. 5 during forward movement of the tractor 42. For unloading, the unit 24 is retracted so as to lower the stack 14 to the ground, whereupon the tractor 42 is driven forwardly to slip the forks 38 from beneath the stack 14.

At that time, if desired, particularly for over-the-road travel, the cylinders 48 may be retracted such as to raise the links 46 and thereby lift the mover 10, including its wheels 30, entirely off the ground such that the mover 10 becomes entirely supported by the tractor 42.

In the event that mover 10 is to be used with a tractor having a conventional drawbar in lieu of the three-point hitch shown in FIGS. 2, 3, 5 and 6, the tongue 58 shown in FIG. 7 may be easily and quickly attached to the pins 52 of the cranks 40 as well as to the crank 44 through use of the device 56 and the mover 10 pivotally coupled with the drawbar through use of a hitch pin coupled with the bracket 60. In that event, the pivoting action between the mover and the tractor during actuation of the power unit 24 takes place at the hitch pin through the bracket 60 and the tractor drawbar.

The same pivotal action takes place at the bracket 64 in the embodiment of FIG. 8, such embodiment not having the advantage, however, of the quick changeover made possible by the embodiment of FIG. 7 because of the fact that the tongue 62 is rigid to the tube 36 as aforesaid.

Having thus described the invention, what is claimed as new and desired to be secured by letters Patent is:

1. A stack mover comprising:
a stack-receiving assembly including:
   an elongated, normally horizontal cross tube, and
   a plurality of forks extending laterally from said tube and rigidly mounted thereon;
a carrier for said assembly including:
   an elongated shaft extending through the tube and rotatable relative thereto,
   a pair of arms extending laterally from said shaft and rigidly mounted thereon, and
   a ground-engaging support for each arm respectively disposed remotely from said shaft;
power means operably interconnecting the assembly and the carrier for swinging the arms up and down to raise and lower the shaft and the tube; and
structure limiting the extent of rotation of the tube relative to the shaft during operation of said power means whereby the forks are raised and lowered in response to raising and lowering of the shaft and the tube,
said tube being provided with tow means for connecting the same with a mobile vehicle and said structure including a crank on the tube having means for operably coupling the same with said vehicle.

2. A stack mover as claimed in claim 1 wherein said forks when lowered are disposed between said supports and when raised are disposed between said arms.

3. A stack mover as claimed in claim 2 wherein said supports are caster wheels provided with axles, said arms swinging about said axles during operation of said power means.

4. A stack mover as claimed in claim 1 wherein the tow means is provided with mechanism for connecting the same with a three-point hitch of said vehicle, said hitch having a pair of power links and a stabilizer link, said mechanism including means for attaching the tube to said power links and means for attaching said crank to said stabilizer link, whereby to raise the entire mover off the ground during actuation of the power links.

5. A stack mover as claimed in claim 1 wherein said tow means includes a tongue connected to the tube and said coupling means is a bar between the tongue and the crank.

6. A stack mover comprising:
a stack-receiving assembly including:
   an elongated, normally horizontal cross tube, and
   a plurality of forks extending laterally from said tube and rigidly mounted thereon;
a carrier for said assembly including:
   an elongated shaft extending through the tube and rotatable relative thereto,
   a pair of arms extending laterally from said shaft and rigidly mounted thereon, and
   a ground-engaging support for each arm respectively disposed remotely from said shaft;
power means operably interconnecting the assembly and the carrier for swinging the arms up and down to raise and lower the shaft and the tube; and
structure limiting the extent of rotation of the tube relative to the shaft during operation of said power means whereby the forks are raised and lowered in response to raising and lowering of the shaft and the tube,
said structure including a tongue rigid to the tube and provided with means for pivotally connecting the same with the drawbar of a towing vehicle.

7. A stack mover comprising:
a stack-receiving assembly including means defining a lifting and transporting bed for the stack;
a ground-supported carrier for said assembly having one end thereof shiftable toward and away from the ground;
a joint forming an articulation between the assembly and said one end of the carrier; and
structure limiting the extent of swinging movement of the assembly at said joint during said shifting of the carrier to raise and lower said assembly,
said structure and said assembly being so disposed with respect to one another that said bed is maintained flatly against the ground when said assembly is fully lowered, whereby to facilitate loading and unloading of the stack by sliding the bed horizontally beneath the stack, said structure including means for coupling the assembly with a vehicle for swinging of the mover about a horizontal axis during raising and lowering of the assembly, the plane of said bed being vertically offset with respect to said axis, said coupling means including a tongue extending from said assembly in vertically spaced, generally parallel relationship with said bed, said coupling means further including an upstanding crank on said assembly and a pair of upwardly projecting components on opposite sides of said crank, said components being directly coupled with said tongue and said crank being indirectly coupled with said tongue through a rigid bracing link.

* * * * *